(12) United States Patent
Akinaga

(10) Patent No.: US 7,778,142 B2
(45) Date of Patent: Aug. 17, 2010

(54) OPTICAL PICKUP APPARATUS AND ELECTRONIC EQUIPMENT HAVING THE SAME

(75) Inventor: Makoto Akinaga, Mihara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 817 days.

(21) Appl. No.: 11/606,679

(22) Filed: Nov. 29, 2006

(65) Prior Publication Data

US 2007/0121474 A1 May 31, 2007

(30) Foreign Application Priority Data

Nov. 30, 2005 (JP) .............................. 2005-347353

(51) Int. Cl.
*G11B 7/00* (2006.01)
(52) U.S. Cl. ....................................... 369/122
(58) Field of Classification Search ................. 369/122, 369/121, 44.14
See application file for complete search history.

(56) References Cited

U.S. PATENT DOCUMENTS

| 5,923,636 A * | 7/1999 | Haruguchi et al. ..... 369/112.12 |
| 2003/0021220 A1 * | 1/2003 | Yamauchi et al. ........... 369/249 |
| 2003/0086356 A1 | 5/2003 | Uchiyama et al. |
| 2004/0046242 A1 * | 3/2004 | Asakawa .................... 257/678 |

FOREIGN PATENT DOCUMENTS

| JP | 8-249699 | 9/1996 |
| JP | 2002-33426 | 1/2002 |
| JP | 2003-45059 | 2/2003 |
| JP | 2003-151159 | 5/2003 |
| JP | 2004-152408 A | 5/2004 |
| JP | 2004-334957 | 11/2004 |
| JP | 2004-348883 | 12/2004 |
| JP | 2005-196923 A | 7/2005 |
| JP | 2005196923 A * | 7/2005 |

* cited by examiner

*Primary Examiner*—Joseph H Feild
*Assistant Examiner*—Nicholas Lee
(74) *Attorney, Agent, or Firm*—Morrison & Foerster LLP

(57) ABSTRACT

There is provided an optical pickup apparatus which is small in size and excellent in releasing action of heat generated inside the apparatus. An optical pickup apparatus includes semiconductor lasers as light sources for emitting light, a laser driver for controlling light emitting operations of the semiconductor lasers, a first housing in which the laser driver is housed, and a second housing in which the semiconductor lasers are housed. The first housing 31 and the second housing are separately formed and connected to each other so as to have a void portion therebetween, which penetrates the first housing and the second housing in thickness directions thereof. The laser driver and the semiconductor lasers are disposed so as to be adjacent to each other via the void portion, and housed in the housing.

12 Claims, 8 Drawing Sheets

FIG. 2 20
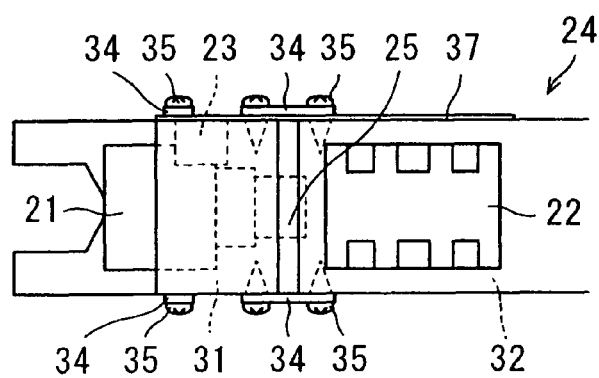
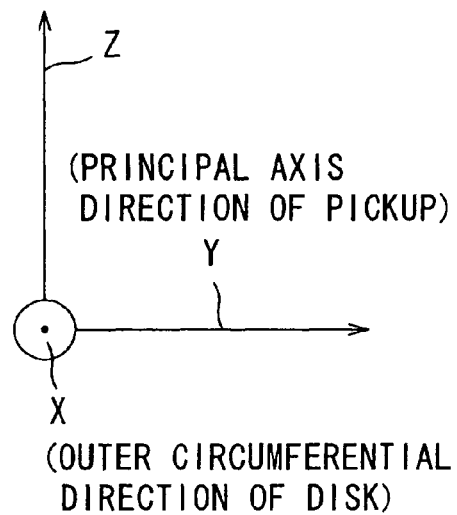
(PRINCIPAL AXIS DIRECTION OF PICKUP)
(OUTER CIRCUMFERENTIAL DIRECTION OF DISK)

FIG. 4 40
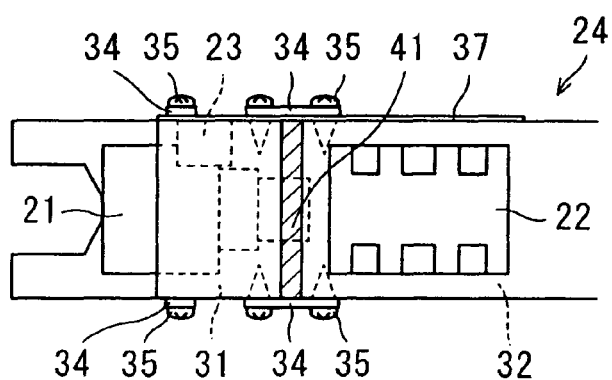
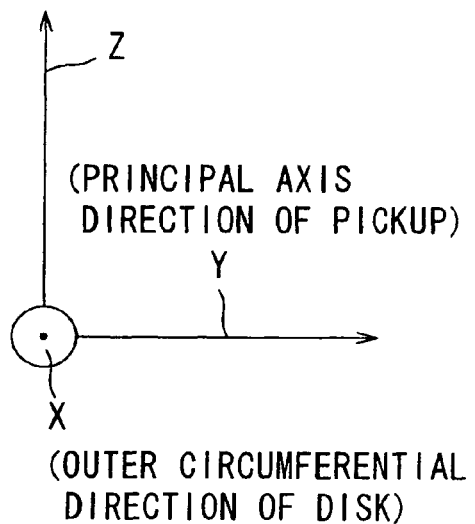
Z (PRINCIPAL AXIS DIRECTION OF PICKUP)
Y
X (OUTER CIRCUMFERENTIAL DIRECTION OF DISK)

FIG. 8 PRIOR ART
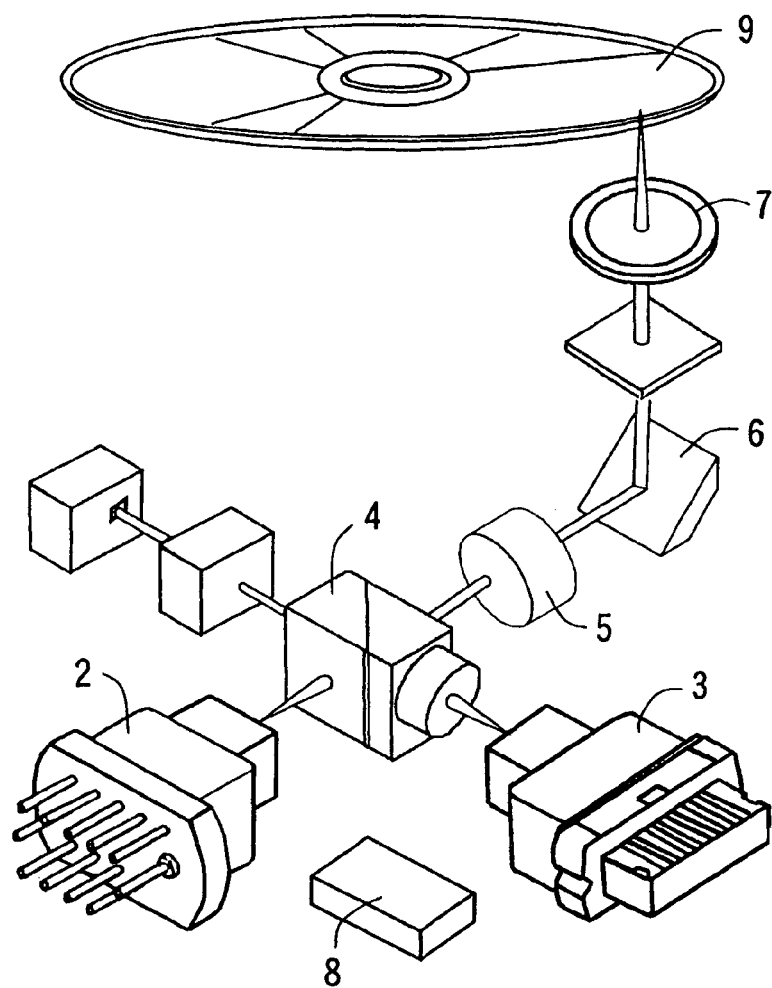
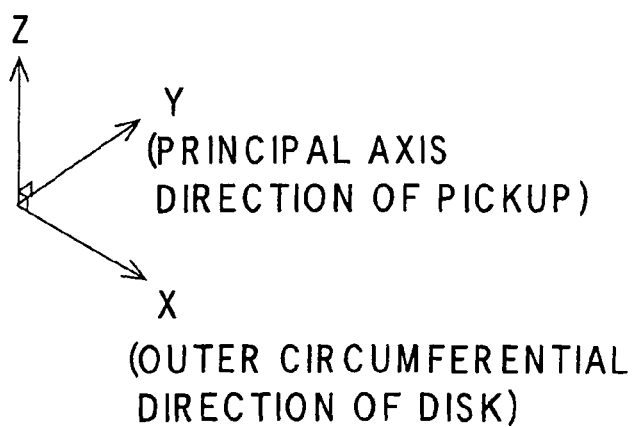
Y (PRINCIPAL AXIS DIRECTION OF PICKUP)
X (OUTER CIRCUMFERENTIAL DIRECTION OF DISK)

(PRINCIPAL AXIS DIRECTION OF PICKUP)

(OUTER CIRCUMFERENTIAL DIRECTION OF DISK)

OPTICAL PICKUP APPARATUS AND ELECTRONIC EQUIPMENT HAVING THE SAME

CROSS-REFERENCE TO RELATED APPLICATION

This application claims priority to Japanese Patent Application No. JP 2005-347353, which was filed on Nov. 30, 2005, the contents of which, are incorporated herein by reference, in their entirety.

BACKGROUND OF THE INVENTION

1. Field of the Invention

The present invention relates to an optical pickup apparatus which is used for recording and/or reproducing data on a light-using recording medium such as a digital versatile disk and a compact disk, and to an electronic equipment having the optical pickup apparatus.

2. Description of the Related Art

In recent years, a notebook-sized personal computer (laptop for short) excelling in mobile convenience has been pervaded, and along with the pervasion of the laptop, there is a tendency of reduction in size and weight of an information recording/reproducing apparatus which serves as an apparatus for recording/reproducing data on a recording medium used in the laptop. Further, a widely-used information recording/reproducing apparatus reduced in size and weight is capable of recording/reproducing data on a plurality of recording mediums such as a digital versatile disk (DVD for short) and a compact disk (CD for short). Such an apparatus is provided with a plurality of laser light sources for recording (writing) and reproducing (reading) data respectively on the plurality of recording mediums, and provided with a laser driver as an integrated circuit (IC) for controlling a light emitting operation of the laser light sources.

FIG. 8 is a schematic view showing an optical layout of a configuration of an optical pickup apparatus 1 according to a related art. FIG. 8 illustrates the conventional optical pickup apparatus 1 of typical type having two pieces of laser light sources 2, 3 and a laser driver 8.

The optical pickup apparatus 1 generally includes: two pieces of integrated light-receiving and -emitting elements 2, 3, each of which has a member collectively composed of a light source for emitting laser light and a light receiving portion for receiving light reflected by a recording medium; a beam splitter 4 as an optical branching element; a collimation lens 5; an erecting mirror 6; an objective lens 7; and a laser driver 8 for controlling an light emitting operation of a semiconductor laser as a light source.

Laser light is emitted from the semiconductor laser as a light source of the integrated light-receiving and -emitting element 2 or the integrated light-receiving and -emitting element 3. The laser light is reflected or transmitted by the beam splitter 4 where the laser light is formed into parallel light, and then reflected by the erecting mirror 6 to be thereby guided to the objective lens 7. The parallel light is formed into converging light by passing through the objective lens 7, and the converging light is converged on one point on a disc (which may be noted as "disk") 9 as a recording medium. The converging light is reflected by the disc 9, and travels back by passing through the objective lens 7 again where the light is formed into parallel light, and being reflected by the erecting mirror 6 to thereby pass through the collimation lens 5 and then reflected or transmitted by the beam splitter 4. The light thus goes back to the integrated light-receiving and -emitting element 2 or the integrated light-receiving and -emitting element 3 by tracking back a route reversely that the light had traveled.

The light (which may be referred to as return light) reflected by the disk 9 is split by a hologram element disposed on a surface of the integrated light-receiving and -emitting element 2 or integrated light-receiving and -emitting element 3, and then enters the light receiving portion. The light receiving portion is provided with a light receiving element which obtains a light signal from the light received. The light signal is converted into an electronic signal which is used for recording, reproducing, and deleting data, or used as a servo signal.

The optical pickup apparatus 1 as described above is reduced in size more rapidly so as to be built in the laptop. Thus, the light-receiving and -emitting elements 2, 3, each of which is provided with a semiconductor laser for dealing with both media of CD and DVD to heighten an added value, or heat-generating components such as the laser driver 8 are concentrated in a thin package of small size in the optical pickup apparatus 1.

FIG. 9 is a plan view schematically showing the configuration of the optical pickup apparatus 1 shown in FIG. 8. In an actuator 11 are mounted two pieces of the integrated light-receiving and -emitting elements 2, 3, the laser driver 8, the beam splitter, 4, the collimation lens 5, the erecting mirror 6, and the objective lens 7. The actuator 11 is installed in a housing 12 which is a metallic frame member. The actuator 11 has a magnetic member, a coil, or the like member, and serves as driving means which utilizes electromagnetic force. The actuator 11 drives the objective lens 7 mounted therein, for tracking that the objective lens 7 is made to follow a track in a recording medium, and for focusing that a light converging position on an information recording surface is adjusted.

The integrated light-receiving and -emitting elements 2, 3 and the laser driver 8 are mounted in a flexible resin board 13 (FPC for short) which is a print wiring board. Further, the optical pickup apparatus 1 has a structure that the laser driver 8 is disposed between two pieces of the integrated light-receiving and -emitting elements 2, 3 so as to decrease an installation area thereof so that the apparatus can be downsized.

As the information technology develops, a double speed recording onto a recording medium develops to a higher level. Under such a circumstance, there is a tendency that an output of the semiconductor laser serving as a laser light source used for recording/reproducing data on a recording medium i.e., the disc 9 becomes higher and moreover, there is another tendency that an output of the laser driver 8 for driving the semiconductor laser also becomes higher, resulting in a higher power consumption. Such a higher output of the semiconductor and an increase in the power consumption of the laser driver 8 lead an increase in heat generated by the optical pickup apparatus having the semiconductor laser and the laser driver, so that the information recording/reproducing apparatus will suffer from a very intensive heat environment. Since the semiconductor laser is a component which is weak against heat even though it is a heat generating source, there is a problem such that a temperature rise of the semiconductor laser causes a decrease in a luminous efficiency.

In order to cope with the problem described above, there is a conventionally proposed technique of forming a concavo-convex-shaped radiator part on a surface portion of a housing which faces a recording medium (refer to Japanese Unexamined Patent Publication JP-A 2004-152408). In JP-A 2004-152408, by virtue of the radiator part formed on the housing, the heat generated especially by the light source can be released to outside of the optical pickup apparatus by means of a rotating recoding medium and the concavo-convex-shaped radiator part in cooperation with each other, so that the heat is prevented from stagnating in the apparatus, allowing stabilization on operation of the apparatus.

However, there resides the following problem in the technique of JP-A 2004-152408 which is focused on the release of heat generated especially by the light source to outside of the apparatus by means of the radiator part and the rotating recording medium. The optical pickup apparatus is provided with the laser driver which is an integrated circuit for driving and controlling the light source generating a larger amount of heat than the semiconductor laser, and therefore the action effected by the radiator part and rotating recording medium is not sufficient at all to release the heat generated by the laser driver and semiconductor laser which have higher power consumption or higher output.

There is another conventional technique which proposes to focus on a layout of the laser driver and semiconductor laser so that the laser driver is disposed in a downstream side in a rotational direction of the recording medium from two pieces of the semiconductor lasers, and which proposes to form separate housings for installing the laser driver and for installing the semiconductor laser (refer to Japanese Unexamined Patent Publication JP-A 2005-196923). In JP-A 2005-196923, the heat generated by the laser driver is not brought to the semiconductor laser by air flow created by rotation of the recording medium and moreover, the housing for installing the laser driver and the housing for installing the semiconductor laser are separate from each other, with the result that the heat generated by the laser driver is not conducted to the housing for installing the semiconductor laser and therefore, the semiconductor laser can be prevented from being excessively heated so that the semiconductor laser can continue to operate stably.

However, in the technique of JP-A 2005-196923, there is a constraint that the laser driver has to be disposed indispensably in the downstream side in the rotational direction of the recording medium from two pieces of the semiconductor lasers. Due to the constraint, a planar installation space is large, with the result that the apparatus has a limit in miniaturization thereof.

SUMMARY OF THE INVENTION

An object of the invention is to provide an optical pickup apparatus which is small in size and excellent in releasing heat generated inside the apparatus, and an electronic equipment having the optical pickup apparatus.

The invention provides an optical pickup apparatus for recording and/or reproducing data on a recording medium, the optical pickup apparatus comprising:

a semiconductor laser as a light source for emitting light;

a laser driver for controlling a light emitting operation of the semiconductor laser; and a housing to which the semiconductor laser and the laser driver are attached, wherein the housing has a void portion which penetrates the housing in a thickness direction thereof, and wherein the laser driver and the semiconductor laser are attached to the housing so as to be adjacent to each other via the void portion.

According to the invention, the optical pickup apparatus for recording/reproducing data on a recording medium includes a semiconductor laser as a light source for emitting light, a laser driver for controlling a light emitting operation of a semiconductor laser, and a housing to which the semiconductor laser and the laser driver are attached. The housing has a void portion which penetrates the housing in a thickness direction thereof. The laser driver and the semiconductor laser are attached to the housing so as to be adjacent to each other via the void portion.

By thus interposing the void portion between the laser driver and the semiconductor laser, conduction of heat which is generated in the laser driver and then is conducted to the housing, is cut off at the void portion and moreover, the heat is effectively removed and released by air flow passing through the void portion. Accordingly, the heat generated in the laser driver is prevented from being conducted directly to the semiconductor laser so that the semiconductor laser is prevented from being excessively heated. Consequently, it is made possible to make the semiconductor laser continue a stable operation for a long period of time. Further, especially when a plurality of semiconductor lasers are provided, an installation space thereof is saved by disposing each of the semiconductor lasers and the laser driver so as to be adjacent to each other via the void portion, with the result that the optical pickup apparatus can be downsized.

Further, in the invention, it is preferable that the housing includes a first housing to which the laser driver is attached, and a second housing to which the semiconductor laser is attached, and the first housing and the second housing are separately formed and connected to each other so as to have the void portion therebetween.

According to the invention, the housing includes a first housing to which the laser driver is attached, and a second housing to which the semiconductor laser is attached. The first housing and the second housing are separately formed and connected to each other so as to have the void portion therebetween. By so doing, the heat which is generated in the laser driver and is then conducted to the first housing, is prevented by the void portion from being conducted to the second housing, so that the semiconductor laser can be prevented from being excessively heated.

Further, in the invention, it is preferable that the housing includes a first housing in which the laser driver is housed, and a second housing in which the semiconductor laser is housed, and the first housing and the second housing are separately formed and connected to each other via a heat insulating member formed of a heat insulating material.

According to the invention, the housing includes a first housing to which the laser driver is attached, and a second housing to which the semiconductor laser is attached. The first housing and the second housing are separately formed and connected to each other via a heat insulating member formed of a heat insulating material. By so doing, the heat which is generated in the laser driver and is then conducted to the first housing, is prevented by the heat insulating member from being conducted to the second housing, so that the semiconductor laser can be prevented from being excessively heated.

Further, in the invention, it is preferable that the first housing has a through hole formed therein, which penetrates the first housing in a thickness direction thereof.

According to the invention, the first housing has a through hole formed therein, which penetrates the first housing in a thickness direction thereof. With a through hole formed in the first housing to which the laser driver is attached, air can flow through the through hole so that the air flow can effectively release the heat which is generated in the laser driver having a large calorific value and which is then conducted to the first housing.

Further, in the invention, it is preferable that the through hole defines an opening portion thereof so as to face an information recording surface of a recording medium attached to be capable of recording/reproducing data, and the opening portion is not covered with any member.

According to the invention, the through hole defines an opening portion thereof so as to face an information recording surface of a recording medium attached to be capable to recording/reproducing data, and the opening portion is constituted so as not to be covered with any member. By so doing, the air flow formed by rotation of the recording medium can securely enter the through hole. Accordingly, it is possible to securely and effectively release the heat which is generated in the laser driver and is then conducted to the first housing.

Further, in the invention, it is preferable that both of the first housing to which the laser driver is attached, and the second housing to which the semiconductor laser is attached, are made of metal, and a thermal conductivity of a metal constituting the first housing is higher than a thermal conductivity of a metal constituting the second housing.

According to the invention, both of the first housing to which the laser driver is attached, and the second housing to which the semiconductor laser is attached, are made of metal. These housings are configured so that a thermal conductivity of a metal constituting the first housing is higher than a thermal conductivity of a metal constituting the second housing. By thus dividing the housing into two housings whose materials are different from each other in thermal conductivity, there increases a freedom degree in designing the optical pickup apparatus. In other words, a material having a high thermal conductivity is used, even when its cost is high, for the first housing to which the laser driver having a high calorific value and thus requiring a high heat releasing property is attached, while a low-cost material can be used for the second housing to which the semiconductor laser requiring only a normal level of heat releasing property is attached. By so doing, it is possible to realize the optical pickup apparatus which has a desired heat releasing property without leading a soaring cost and which can continue a stable operation for a long period of time.

Further, in the invention, it is preferable that the optical pickup apparatus further comprises a flexible resin board which is a print wiring board, and the semiconductor laser and the laser driver share the flexible resin board as wirings for electrical connection with other members.

According to the invention, the optical pickup apparatus comprises a flexible resin board which is a print wiring board, and the semiconductor laser and the laser driver share the flexible resin board as wirings for electrical connection with other members, with the result that the number of components can be reduced.

Further, the invention provides an electronic equipment having any one of the above-described optical pickup apparatuses.

According to the invention, an electronic equipment is excellent in operational stability and can be reduced in size owing to one of the above-described optical pickup apparatuses provided thereto.

BRIEF DESCRIPTION OF THE DRAWINGS

Other and further objects, features, and advantages of the invention will be more explicit from the following detailed description taken with reference to the drawings wherein:

FIG. 2 is a side view of the optical pickup apparatus shown in FIG. 1;

FIG. 4 is a side view of the optical pickup apparatus shown in FIG. 3;

FIG. 8 is a schematic view showing an optical layout of a configuration of an optical pickup apparatus according to the related art.

DETAILED DESCRIPTION

Figure 1:
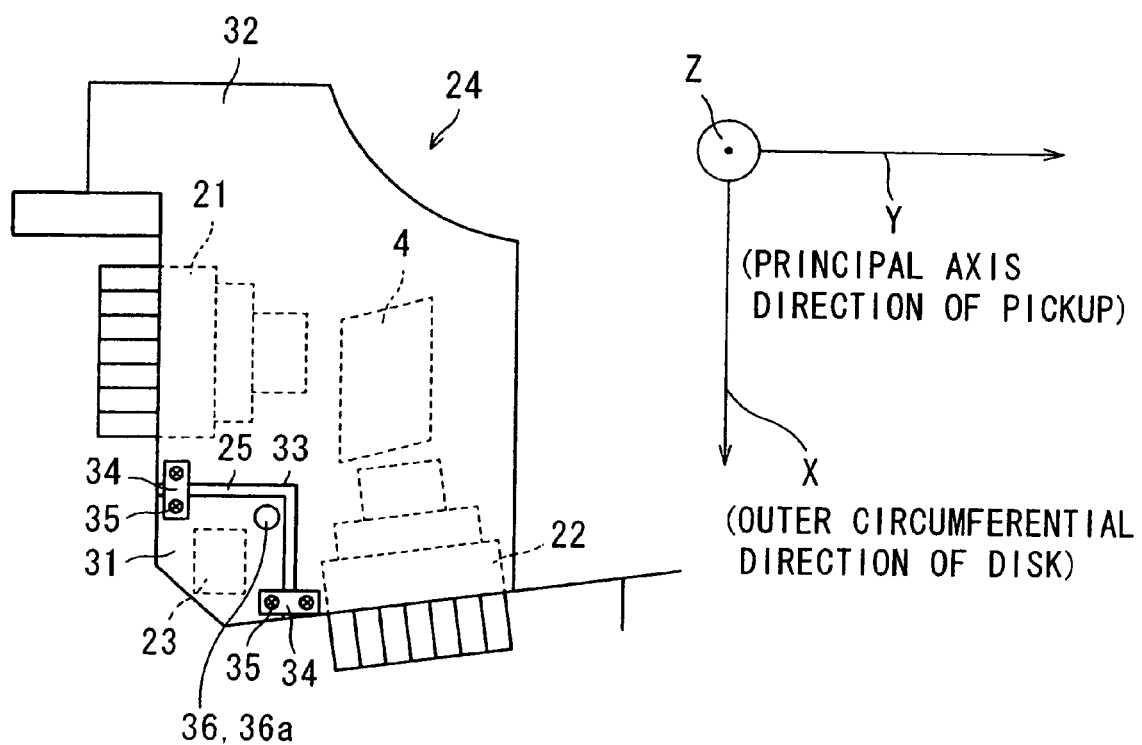
FIG. 1 is a plan view schematically showing a configuration of an optical pickup apparatus according to a first embodiment of the invention.

Now referring to the drawings, preferred embodiments of the invention are described below.

FIG. 1 is a plan view schematically showing a configuration of an optical pickup apparatus 20 according to a first embodiment of the invention. FIG. 2 is a side view of the optical pickup apparatus 20 shown in FIG. 1. The optical pickup apparatus 20 is used for recording and/or reproducing data on a recording medium, i.e. a disc. Further, the optical pickup apparatus 20 may be used for deleting data recorded on the disc.

The optical pickup apparatus 20 comprises: two pieces of semiconductor lasers 21, 22 serving as light sources for emitting light; a laser driver 23 which is an integrated circuit (IC) for controlling a light emitting operation of the semiconductor lasers 21, 22; a housing 24 for installing the semiconductor lasers 21, 22 and laser driver 23; and an optical system for converging light emitted by the semiconductor lasers 21, 22 onto an information recording surface of a disc.

Note that indications X, Y, and Z in FIG. 1 and FIG. 2 represent the following directions. That is, the X direction represents an outer circumferential direction of a disc, i.e. a tangential direction of a track formed in the disc. And the Y direction represents a direction perpendicular to the X direction in a horizontal plane, which is a direction of a principal axis of a pickup, i.e. a radial direction of the disc. Finally, the Z direction represents a direction perpendicular to both of the X direction and the Y direction, i.e. a direction in which the objective lens moves close to and away from the disc. These X direction, Y direction, and Z direction are commonly used in the entire specification.

An entire structure of the optical pickup apparatus 20 is similar to that of the optical pickup apparatus 1 shown in FIG. 8. The optical pickup apparatus 20 includes as optical systems, a beam splitter 4, a collimation lens, an erecting mirror, an objective lens, or the like as in the case of the optical pickup apparatus 1. These optical systems have the same configurations as those in the above-described optical pickup apparatus 1, so that explanations thereof will be omitted.

In the present embodiment, the semiconductor laser serving as a light source is not a single piece of semiconductor laser, but an integrated light-receiving and -emitting element composed of a hologram element for diffracting the return light traveling back from the disc; and a light receiving portion for receiving light diffracted by the hologram element. The integrated light-receiving and -emitting element can receive the return light reflected by the disc, and detect a reproducing signal, a tracking error signal, and a focusing error signal. Accordingly, as components of the optical pickup apparatus 20, the integrated light-receiving and -emitting element should be referred to first and second light-receiving and -emitting elements, but referred herein to first and second semiconductor lasers 21, 22 for the sake of convenience.

The first semiconductor laser 21 used, for example, can emit infrared laser light usable for recording/reproducing data on a CD while the second semiconductor laser 22 used, for example can emit infrared laser light usable for recording/reproducing data on a DVD. By thus configuring two pieces of the semiconductor lasers, the optical pickup apparatus 20 can record/reproduce data on two types of recording mediums, i.e. CD and DVD.

The laser driver 23 is realized by an IC as described above, and mounted in the print wiring board, i.e. the flexible resin board (hereinafter abbreviated as FPC) 37, together with the first and second semiconductor lasers 21, 22. By so doing, the laser driver 23 is electrically connected to the first and second semiconductor lasers 21, 22 so that the laser driver 23 outputs a light emitting operation-control signal to the first and second semiconductor lasers 21, 22.

In the housing 24 is formed a void portion penetrating the housing 24 in a thickness direction thereof. The laser driver 23 and semiconductor lasers 21, 22 are disposed so as to be adjacent to each other via the void portion 25, and attached to the housing 24.

Hereinafter, the configuration composed of the housing 24, the void portion 25, the laser driver 23, and the first and second semiconductor lasers 21, 22 will be described. The housing 24 includes a first housing 31 to which the laser driver 23 is attached, and a second housing 32 to which the first and second semiconductor lasers 21, 22 are attached. The fist housing 31 and the second housing 32 are formed separately and connected to each other with the void portion 25 therebetween.

In the embodiment, the first housing 31 is formed into a schematic pentagon when viewed in a plane, including two sides crossing at right angles. The second housing 32 is formed into a schematic rectangle when view in a plane, and between the first semiconductor laser 21 and the second semiconductor laser 22 in the second housing 32 is formed an aduncate cutout portion 33 whose sides correspond to the two sides crossing at right angles of the first housing 31. In the above-described cutout portion 33 of the second housing 32 is disposed the first housing 31 so that the first housing 31 and the second housing 32 are connected to each other with a gap of the void portion 25 therebetween.

A connection between the first housing 31 and the second housing 32 is effected by disposing a plurality of connection plates 34 so as to abut on the first housing 31 and the second housing 32 across the void portion 25, and screwing the connection plates 34 on the first housing 31 and the second housing 32 by male screw member (screw) 35. A welding, an adhesion, or the like method may be also applicable to the connection between the first housing 31 and the second housing 32. Note that the connection plate 34 is made of a material through which heat is hard to be conducted, that is, a material having a low thermal conductivity. Most preferable is resin materials such as epoxy resin having a thermal conductivity of about 1 W/(m·k). However, in view of its strength, it is preferable that the connection plate 34 be made of tin (having a thermal conductivity of about 70 W/(m·k)) or bismuth (having a thermal conductivity of about 10 W/(m·k)).

Since the void portion 25 is formed between the first housing 31 and the second housing 32, direct heat conduction from the first housing 31 to the second housing 32 is cut off at the void portion 25. It is therefore possible to prevent heat generated in the laser driver from being conducted directly to the first and second semiconductor lasers 21, 22 via the first housing 31 and the second housing 32.

Further, the void portion 25 formed between the first housing 31 and the second housing 32 plays a role as an air-cooling duct by serving as a passage of air flow generated by rotation of a disc in a state of recording/reproducing data. Accordingly, the air flow passing through the void portion 25 removes the heat which is generated in the laser driver 23 and the first and second semiconductor lasers 21, 22 and is then conducted to the first and second housings 31, 32. By releasing such heat, an effect of cooling down actively the laser driver 23 and the first and second semiconductor lasers 21, 22 can be exhibited.

Furthermore, the laser driver 23 and the first and second semiconductor lasers 21, 22 are disposed so as to be adjacent to each other via the void portion 25. To be more specific, the laser driver 23 is disposed between the first semiconductor laser 21 and the second semiconductor laser 22. By employing such a constitution, it is possible to cut waste of installation space so that the optical pickup apparatus 20 can be downsized.

Both of the first housing 31 to which the laser driver 23 is attached, and the second housing 32 to which the first and second semiconductor lasers 21, 22 are attached, are preferably made of metal. It is preferable that a thermal conductivity of metal constituting the first housing 31 be selected so as to be higher than a thermal conductivity of metal constituting the second housing 32.

Metallic materials for the housings include, for example, zinc die-casting, aluminum die-casting, and magnesium die-casting. These materials are different not only in values of properties such as thermal conductivity, specific gravity and hardness, but also in production cost. Generally, a material having a high thermal conductivity is aluminum die-casting. Following the aluminum die-casting, the heat conductivities of the zinc die-casting and the magnesium die-casting are high in this order. The specific gravities of the magnesium die-casting, aluminum die-casting, and zinc die-casting are smaller in this order. Further, as comparing the production costs in terms of durability of casting dies, durability levels of the zinc die-casting, magnesium die-casting, and aluminum die-casting are higher in this order. Note that thermal conductivities of these materials are 100 to 200 W/(m·k).

The materials for the housings can be selected depending on use and purpose of each housing. For example, when the housings are separately formed just like the first housing 31 and the second housing 32, as a material of the first housing 31 for mounting therein the laser driver 23 having a large calorific value resulting in a high temperature, there may be selected the aluminum die-casting having a high thermal conductivity, and as a material of the second housing 32 for mounting therein the first and second semiconductor lasers 21, 22, there may be selected the zinc die-casting having a thermal conductivity lower than that of the aluminum die-casting.

As described above, the constitution is selected and designed so that heat of the laser driver 23 having a large calorific value is released from the first housing 31 made of the aluminum die-casting having a high thermal conductivity while heat of the first and second semiconductor lasers 21, 22 having a smaller calorific value than that of the laser driver 23 is released from the second housing 32 made of the zinc die-casting having a thermal conductivity lower than that of the aluminum die-casting. By so doing, the cost can be suppressed from soaring, and an efficient heat releasing property can be attained.

Further, in the embodiment, the first housing 31 has a through hole 36 formed therein, which penetrates the first housing 31 in a thickness direction thereof. The through hole 36 defines an opening portion 36a so as to face the information recording surface of the disc attached to be capable of recording/reproducing data. The opening portion 36a is not covered with any member; that is, not closed up. The through hole 36 plays a role as an air-cooling duct, as in the case of the void portion 25, by serving as a passage of air flow generated by rotation of the disc. Accordingly, the air flow passing through the through hole 36 removes the heat which is generated in the laser driver 23 and is then conducted to the first housings 31. By releasing such heat, an effect of cooling down actively the laser driver 23 can be exhibited.

As described above, not only because the first housing 31 is formed of the aluminum die-casting having an excellent thermal conductivity, but also because the void portion 25 is formed between the first housing 31 and the second housing 32 and furthermore the first housing 31 has the through hole 36 formed therein, the heat generated in the laser driver 23 can be quickly conducted and spread out so that the heat is removed by the air flow passing through the void portion 25 and the through hole 36 to be thereby released, resulting in an excellent heat releasing property and a high cooling efficiency. Moreover, between the first housing 31 and the second housing 32 is formed the void portion 25 which cuts off the heat conduction from the first housing 31 to the second housing 32. Consequently, the heat generated in the laser driver 23 is never transferred to the first and second semiconductor lasers 21, 22, so that the first and second semiconductor lasers are not excessively heated. As a result, it is possible to keep a stable operation for a long period of time.

Further, the optical pickup apparatus 20 includes the FPC 37 as described above. The semiconductor lasers 21, 22 and the laser driver 23, all of which are mounted on the FPC 37, share the FPC 37 as wirings for electrical connection with other members. Accordingly, it is made possible to reduce the number of wiring components.

Figure 3:
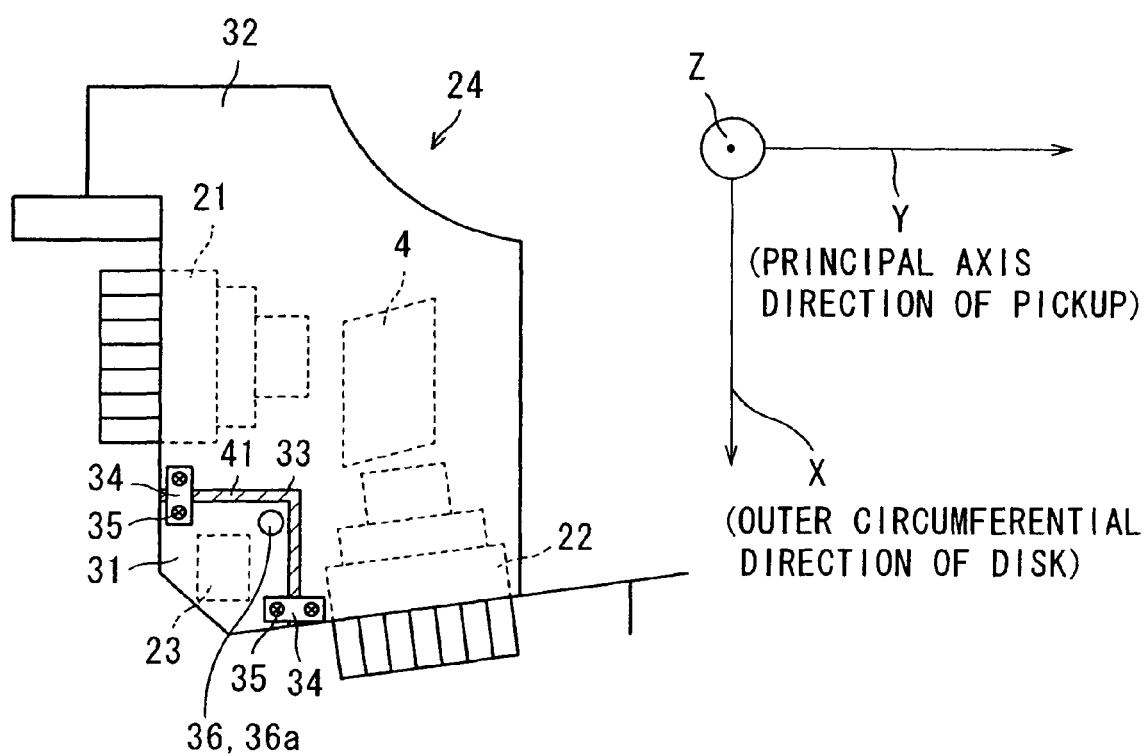
FIG. 3 is a plan view schematically showing a configuration of an optical pickup apparatus according to a second embodiment of the invention.

FIG. 3 is a plan view schematically showing a configuration of an optical pickup apparatus 40 according to a second embodiment of the invention. FIG. 4 is a side view of the optical pickup apparatus 40 shown in FIG. 3. The optical pickup apparatus 40 according to the present embodiment is similar to the optical pickup apparatus 20 according to the first embodiment and therefore, the components that play the same or corresponding roles will be denoted by the same reference numerals so that descriptions thereof will be omitted.

It is noteworthy that the optical pickup apparatus 40 includes the first housing 31 to which the laser driver 23 is attached, and the second housing 32 to which the semiconductor lasers 21, 22 are attached, and the first housing 31 and the second housing 32 are formed separately and connected to each other via a heat insulating member 41 formed of a heat insulating material. In other words, the optical pickup apparatus 40 is configured by filling the void portion 25 of the above-described optical pickup apparatus 20 with the heat insulating member 41.

As the heat insulating material for the heat insulating member 41, preferably used is a material having a thermal conductivity of 0.060 W/(m·K) or less, such as resin, foamed plastic, and glass wool.

By connecting the first housing 31 to the second housing 32 via the heat insulating member 41, the heat which is generated in the laser driver 23 and is then conducted to the first housing 31, is prevented by the heat insulating member 41 from being conducted to the second housing 32. Accordingly, the semiconductor lasers 21, 22 can be prevented from being excessively heated so that a stable operation of the semiconductor lasers 21, 22 can continue for a long period of time.

Figure 5:
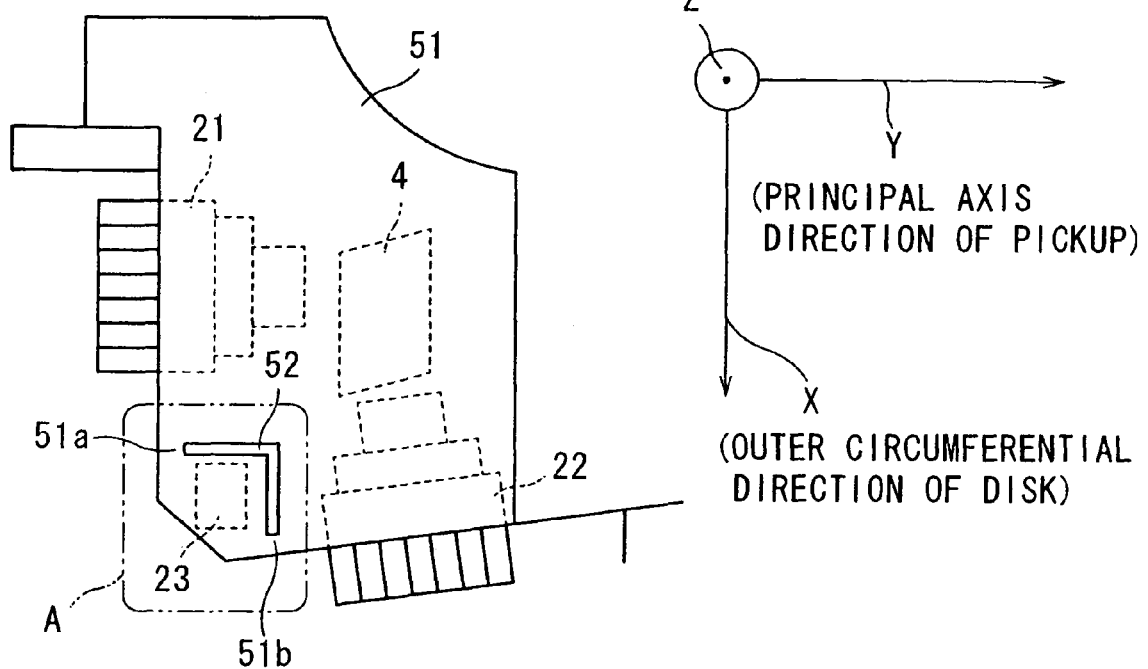
FIG. 5 is a plan view schematically showing a configuration of an optical pickup apparatus according to a third embodiment of the invention.
Figure 6:
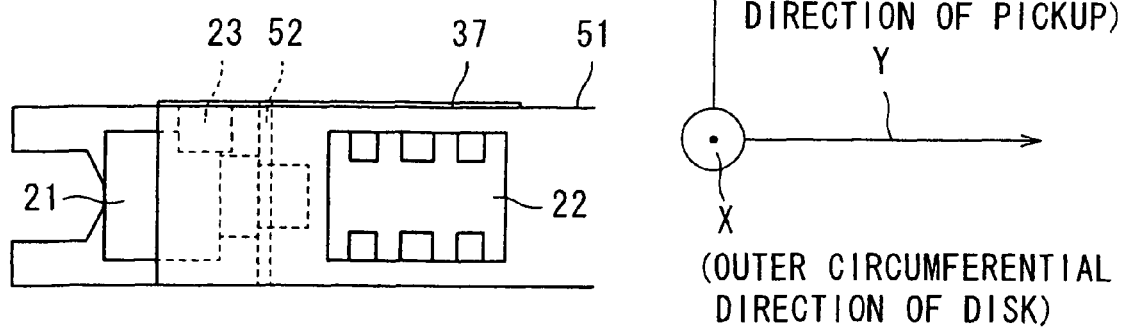
FIG. 6 is a side view of the optical pickup apparatus shown in FIG. 5.
Figure 7:
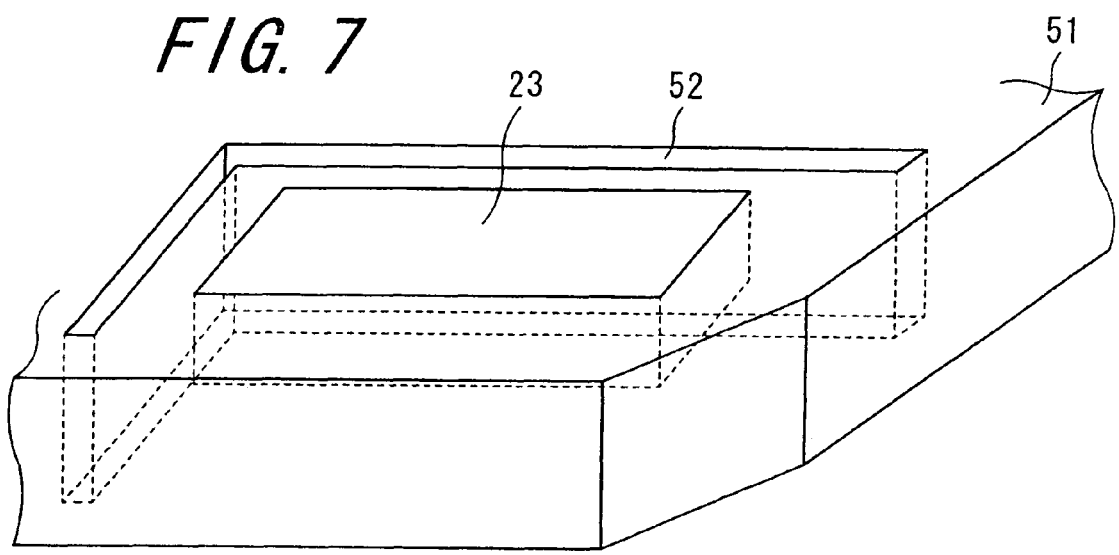
FIG. 7 is an enlarged perspective view of an A section shown in FIG. 5.
Figure 9:
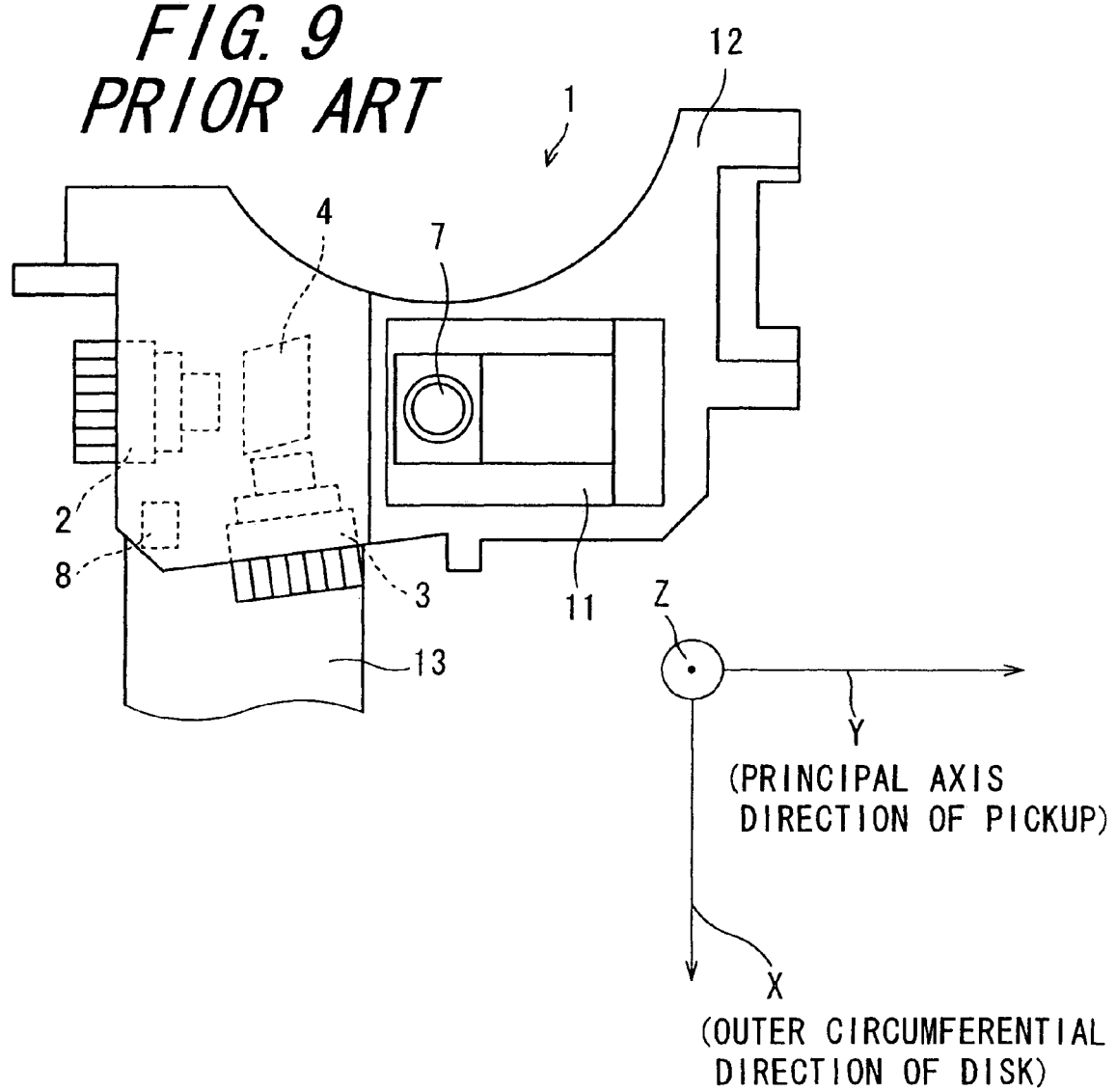
FIG. 9 is a plan view schematically showing the configuration of the optical pickup apparatus shown in FIG. 8.

FIG. 5 is a plan view schematically showing a configuration of an optical pickup apparatus 50 according to a third embodiment of the invention. FIG. 6 is a side view of the optical pickup apparatus 50 shown in FIG. 5. FIG. 7 is an enlarged perspective view of an A section shown in FIG. 5.

The optical pickup apparatus 50 according to the present invention is similar to the optical pickup apparatus 20 according to the first embodiment and therefore, the components that play the same or corresponding roles will be denoted by the same reference numerals so that descriptions thereof will be omitted.

In the optical pickup apparatus 50, it is noteworthy that the housing 51 to which the laser driver 23 and the first and second semiconductor lasers 21, 22 are attached, is not divided into two parts but formed of a single part, and a void portion 52 is formed so as to penetrate the housing 51 formed of the single part in a thickness direction thereof, and the laser driver 23 and the first and second semiconductor lasers 21, 22 which are disposed so as to be adjacent to each other via the void portion 52, are attached to the housing 51.

The void portion 52 is formed into an aduncate shape when seen in a plane, so as to surround two surfaces; one surface facing the first semiconductor laser 21 and the other surface facing the second semiconductor laser 22, of the laser driver 23 which is disposed so as to be adjacent to each of the first and second semiconductor lasers 21, 22 and which is attached to the housing 51. Accordingly, a portion of the housing 51 to which the laser driver 23 is attached and a portion of the housing 51 to which the first and second semiconductor lasers 21, 22 are attached, are linked to each other into a single body by means of joints 51a, 51b, each of which has a small sectional area in a thickness direction thereof.

In the optical pickup apparatus 50, the housing 51 is integrally formed. The laser driver 23 and the first and second semiconductor lasers 21, 22 are adjacent to each other via the void portion 52. Accordingly, most part of conduction in directions of the first and second semiconductor lasers 21, 22, of the heat generated in the laser driver 23 is cut off by the void portion 52 while the heat is conducted only through the small joints 51a, 51b other than the void portion 52. Consequently, the heat generated in the laser driver 23 is prevented from being conducted to the first and second semiconductor lasers 21, 22, so that the first and second semiconductor lasers 21, 22 are prevented from being excessively heated. As a result, it is possible to keep a stable operation for a long period of time.

Further, the heat which has been generated in the laser driver 23 and then is conducted to the portion of the housing 51 having the laser driver 23 attached thereto, is removed and released by the air flow produced by rotation of the disc when the air flow passes through the void portion 52, so that the laser driver 23 is cooled down.

Note that the void portion 52 may be configured so as to be filled with the heat insulating member. The same effects as those obtained in the optical pickup apparatus 50 can be attained also in an optical pickup apparatus where the void portion 52 is filled with the heat insulating member.

An electronic equipment having one of the above-described optical pickup apparatuses of the invention, including a DVD recorder and a personal computer, is construed as another embodiment of the invention. The electronic equipment having the optical pickup apparatus of the invention is excellent in a heat releasing property of the optical pickup apparatus, so that the first and second semiconductor lasers and the laser driver are not excessively heated. As a result, the electronic equipment can continue to stably perform operations for recording/reproducing of data.

As described above, in the embodiments are exemplified the optical pickup apparatus having two semiconductor lasers. However, the number of the semiconductor lasers provided in the optical pickup apparatus is not limited to two, but may be one or may be three or more.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus for recording and/or reproducing data on a recording medium, the optical pickup apparatus comprising:
    two semiconductor lasers as light sources for emitting light;
    a laser driver for controlling light emitting operations of the two semiconductor lasers;
    a first housing to which the laser driver is attached; and
    a second housing to which the two semiconductor lasers are attached,
    wherein the first housing has two side surfaces which are adjacent and perpendicular to each other,
    the second housing has a recess comprising two side surfaces which are parallel to the two side surfaces of the first housing,
    the first housing is arranged in the recess of the second housing so that the two side surfaces thereof are separated from the two side surfaces of the second housing and is connected to the second housing by a heat-insulating connecting member so that a space having an L-shaped cross section is formed between the first housing and the second housing, and
    the two semiconductor lasers are arranged so as to be adjacent to the laser driver with the space having the L-shaped cross section therebetween.

2. The optical pickup apparatus of claim 1, wherein the first housing has a through hole formed therein which penetrates the first housing in a thickness direction thereof.

3. The optical pickup apparatus of claim 2, wherein the through hole defines an opening portion thereof so as to face an information recording surface of a recording medium attached to be capable of recording/reproducing data, and the opening portion is not covered with any member.

4. The optical pickup apparatus of claim 1, wherein both of the first housing and the second housing are made of metal, and
    a thermal conductivity of a metal constituting the first housing is higher than a thermal conductivity of a metal constituting the second housing.

5. The optical pickup apparatus of claim 1, further comprising a flexible resin board which is a print wiring board,
    wherein the semiconductor laser and the laser driver share the flexible resin board as wirings for electrical connection with other members.

6. An electronic equipment having the optical pickup apparatus of claim 1.

7. An optical pickup apparatus for recording and/or reproducing data on a recording medium, the optical pickup apparatus comprising:
    two semiconductor lasers as light sources for emitting light;
    a laser driver for controlling light emitting operations of the two semiconductor lasers;
    a first housing to which the laser driver is attached; and
    a second housing to which the two semiconductor lasers are attached,
    wherein the first housing has two side surfaces which are adjacent and perpendicular to each other,
    the second housing has a recess comprising two side surfaces which are parallel to the two side surfaces of the first housing,
    the first housing is arranged in the recess of the second housing so that the two side surfaces thereof are separated from the two side surfaces of the second housing,
    a heat-insulating connecting member having an L-shaped cross section is formed between the first housing and the second housing, and
    the two semiconductor lasers are arranged so as to be adjacent to the laser driver with the heat-insulating member therebetween.

8. The optical pickup apparatus of claim 7, wherein the first housing has a through hole formed therein which penetrates the first housing in a thickness direction thereof.

9. The optical pickup apparatus of claim 8, wherein the through hole defines an opening portion thereof so as to face an information recording surface of a recording medium attached to be capable of recording/reproducing data, and the opening portion is not covered with any member.

10. The optical pickup apparatus of claim 7, wherein both of the first housing and the second housing are made of metal, and
    a thermal conductivity of a metal constituting the first housing is higher than a thermal conductivity of a metal constituting the second housing.

11. The optical pickup apparatus of claim 7, further comprising a flexible resin board which is a print wiring board,
    wherein the semiconductor laser and the laser driver share the flexible resin board as wirings for electrical connection with other members.

12. An electronic equipment having the optical pickup apparatus of claim 7.

* * * * *